US010175726B2

United States Patent
Lee et al.

(10) Patent No.: US 10,175,726 B2
(45) Date of Patent: Jan. 8, 2019

(54) FOLDABLE DISPLAY DEVICE CAPABLE OF FIXING SCREEN BY MEANS OF FOLDING DISPLAY AND METHOD FOR CONTROLLING THE FOLDABLE DISPLAY DEVICE

(71) Applicant: LG ELECTRONICS INC., Seoul (KR)

(72) Inventors: Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/527,001

(22) PCT Filed: Nov. 17, 2014

(86) PCT No.: PCT/KR2014/011005
§ 371 (c)(1),
(2) Date: May 15, 2017

(87) PCT Pub. No.: WO2016/080559
PCT Pub. Date: May 26, 2016

(65) Prior Publication Data
US 2017/0322597 A1    Nov. 9, 2017

(51) Int. Cl.
*G06F 1/16*    (2006.01)
*G06F 3/14*    (2006.01)
(Continued)

(52) U.S. Cl.
CPC .......... *G06F 1/1652* (2013.01); *G06F 1/1615* (2013.01); *G06F 1/1641* (2013.01);
(Continued)

(58) Field of Classification Search
CPC .......................... G06F 1/1641; G06F 3/04886
See application file for complete search history.

(56) References Cited

U.S. PATENT DOCUMENTS

2007/0268264 A1    11/2007  Aarras et al.
2010/0182265 A1*    7/2010  Kim ...................... G06F 1/1616
                                                    345/173
(Continued)

FOREIGN PATENT DOCUMENTS

EP        2685373        1/2014
KR     1020100082451     7/2010
(Continued)

OTHER PUBLICATIONS

PCT International Application No. PCT/KR2014/011005 Written Opinion of the International Searching Authority dated Jul. 28, 2015, 27 pages.
(Continued)

*Primary Examiner* — Said Broome
*Assistant Examiner* — Jonathan M Cofino
(74) *Attorney, Agent, or Firm* — Lee, Hong, Degerman, Kang & Waimey

(57) ABSTRACT

The foldable display device includes a display unit having first and second display regions separated spatially or visually by being folded; a folding sensor unit for outputting a status signal regarding the degree to which the display unit is folded; and a control unit. The control unit executes a first mode in which the entire screen displayed on the display unit in a fully open state is controlled, and a second mode in which, when the state changes from the fully open state to an intermediately folded state, the screen of the display region in which the touch of a user is sensed is controlled from among the first and second display regions.

19 Claims, 13 Drawing Sheets

(51) Int. Cl.
*G06F 3/0488* (2013.01)
*G06F 3/0481* (2013.01)
*G06F 3/0484* (2013.01)
*G06F 3/0485* (2013.01)
*G06F 3/147* (2006.01)

(52) U.S. Cl.
CPC .......... *G06F 1/1643* (2013.01); *G06F 1/1647* (2013.01); *G06F 1/1677* (2013.01); *G06F 3/0481* (2013.01); *G06F 3/0484* (2013.01); *G06F 3/0485* (2013.01); *G06F 3/0488* (2013.01); *G06F 3/1423* (2013.01); *G06F 3/147* (2013.01); *G06F 2203/04803* (2013.01); *G09G 2340/045* (2013.01); *G09G 2340/0442* (2013.01); *G09G 2340/0492* (2013.01); *G09G 2340/14* (2013.01); *G09G 2340/145* (2013.01); *G09G 2380/02* (2013.01)

(56) References Cited

U.S. PATENT DOCUMENTS

2012/0242703 A1   9/2012   Sirpal et al.
2013/0021266 A1   1/2013   Selim
2013/0307816 A1   11/2013  Lee et al.
2013/0321340 A1*  12/2013  Seo ...................... G06F 1/1641
                                                            345/174

FOREIGN PATENT DOCUMENTS

KR   1020140115226   9/2014
WO   2013154275     10/2013

OTHER PUBLICATIONS

European Patent Office Application Serial No. 14906348.9, Search Report dated May 7, 2018, 11 pages.

\* cited by examiner

FIG. 3B
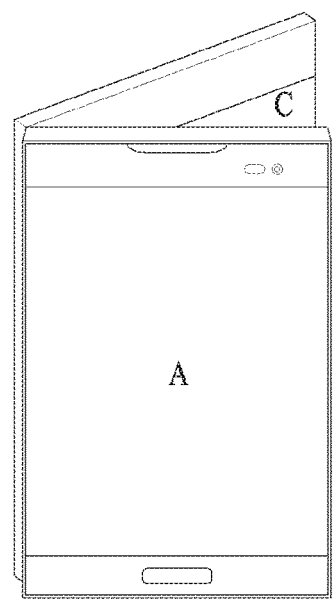
(a)
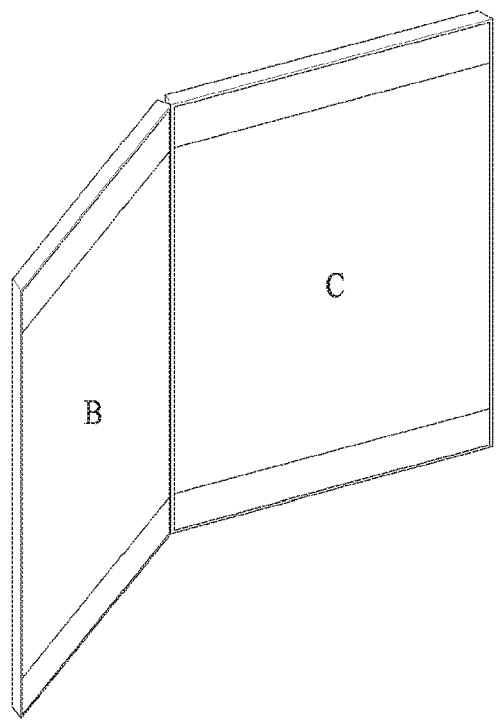
(b)

FIG. 3C
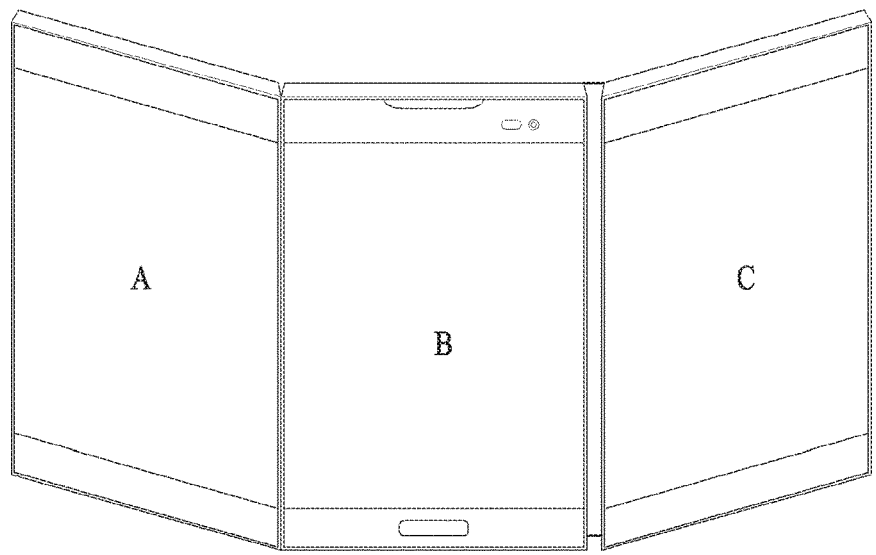
(a)
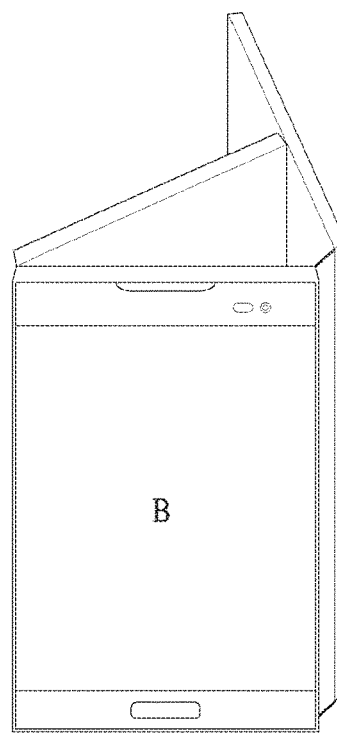
(b)

FIG. 3D
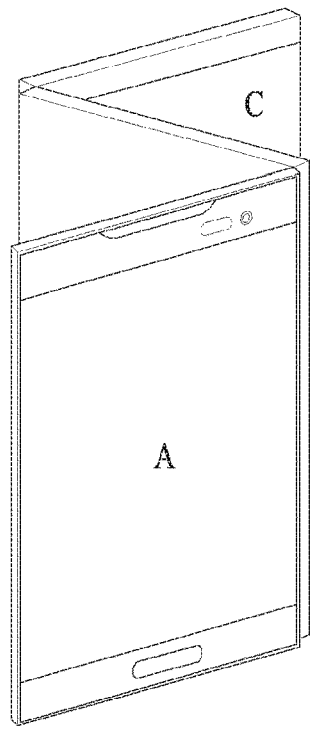
(a)
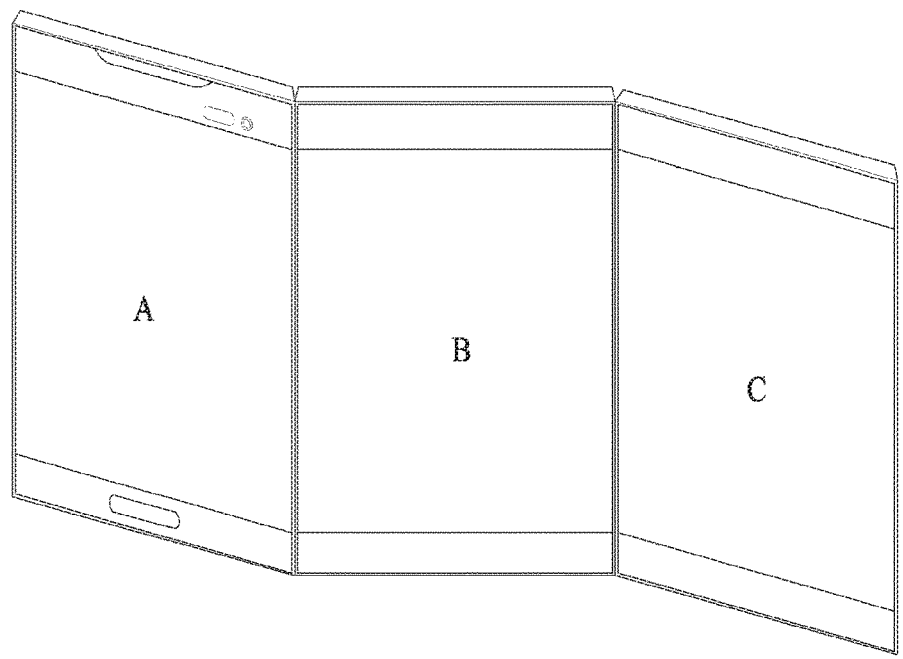
(b)

FIG. 3E
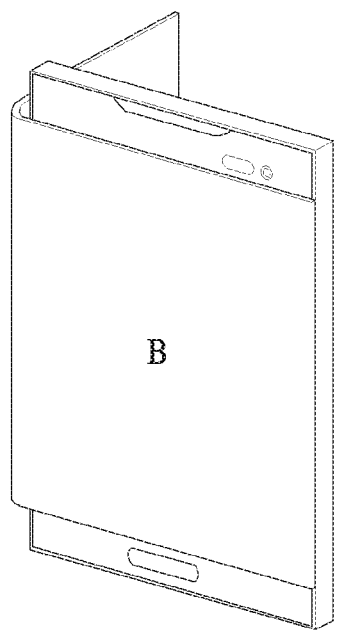
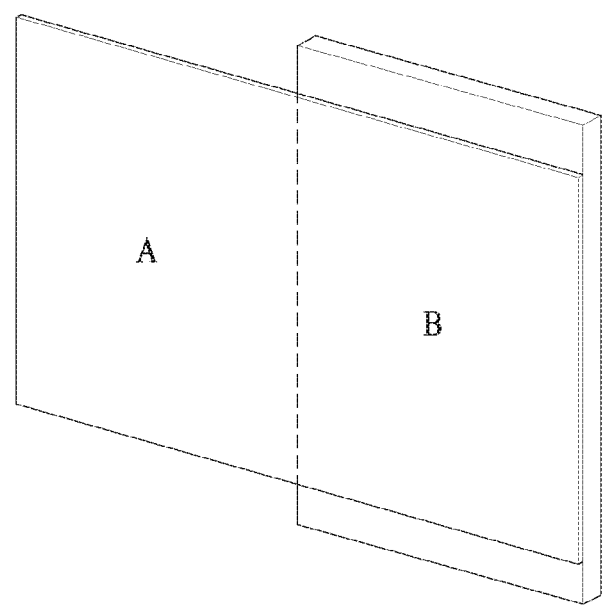

FIG. 4
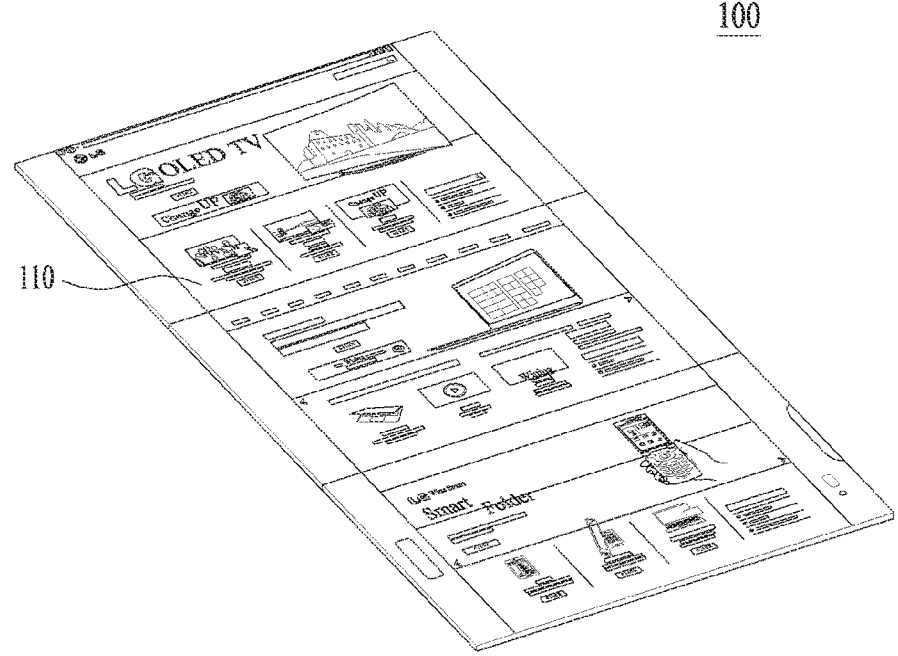
(a)
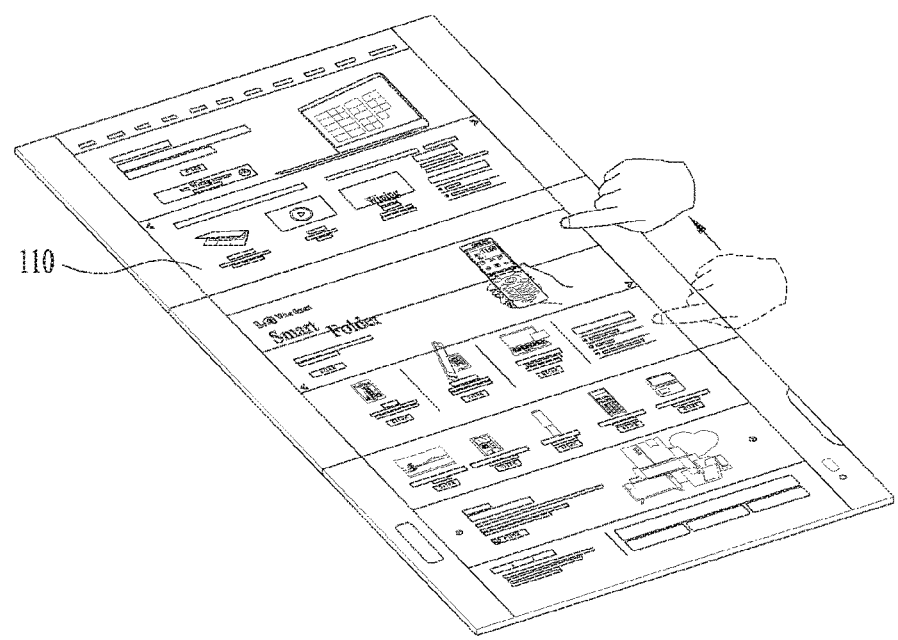
(b)

FIG. 9
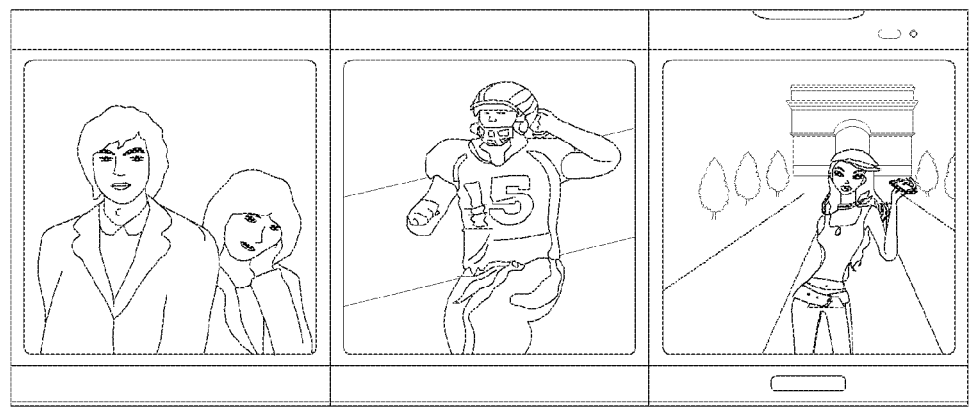
(a)
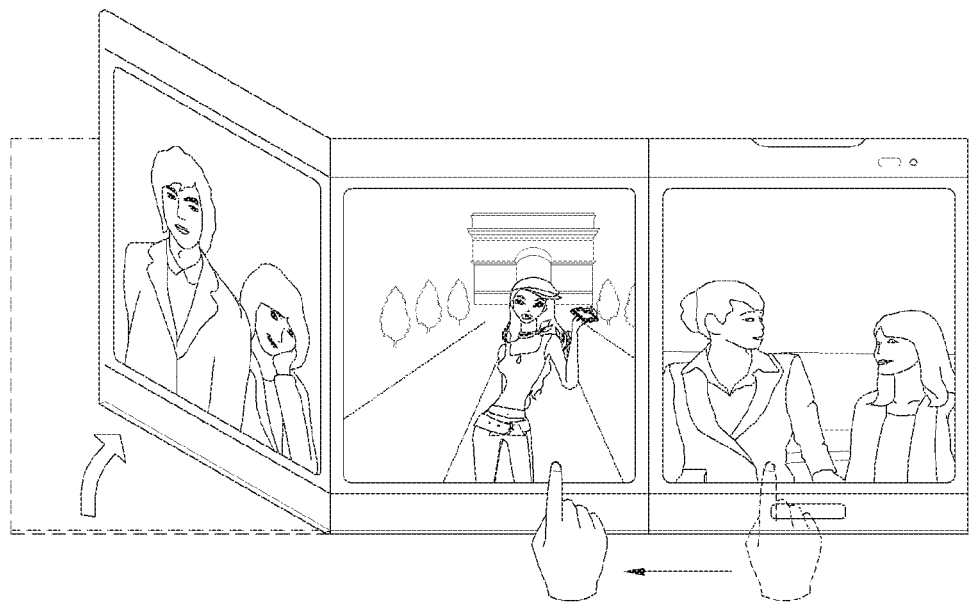
(b)

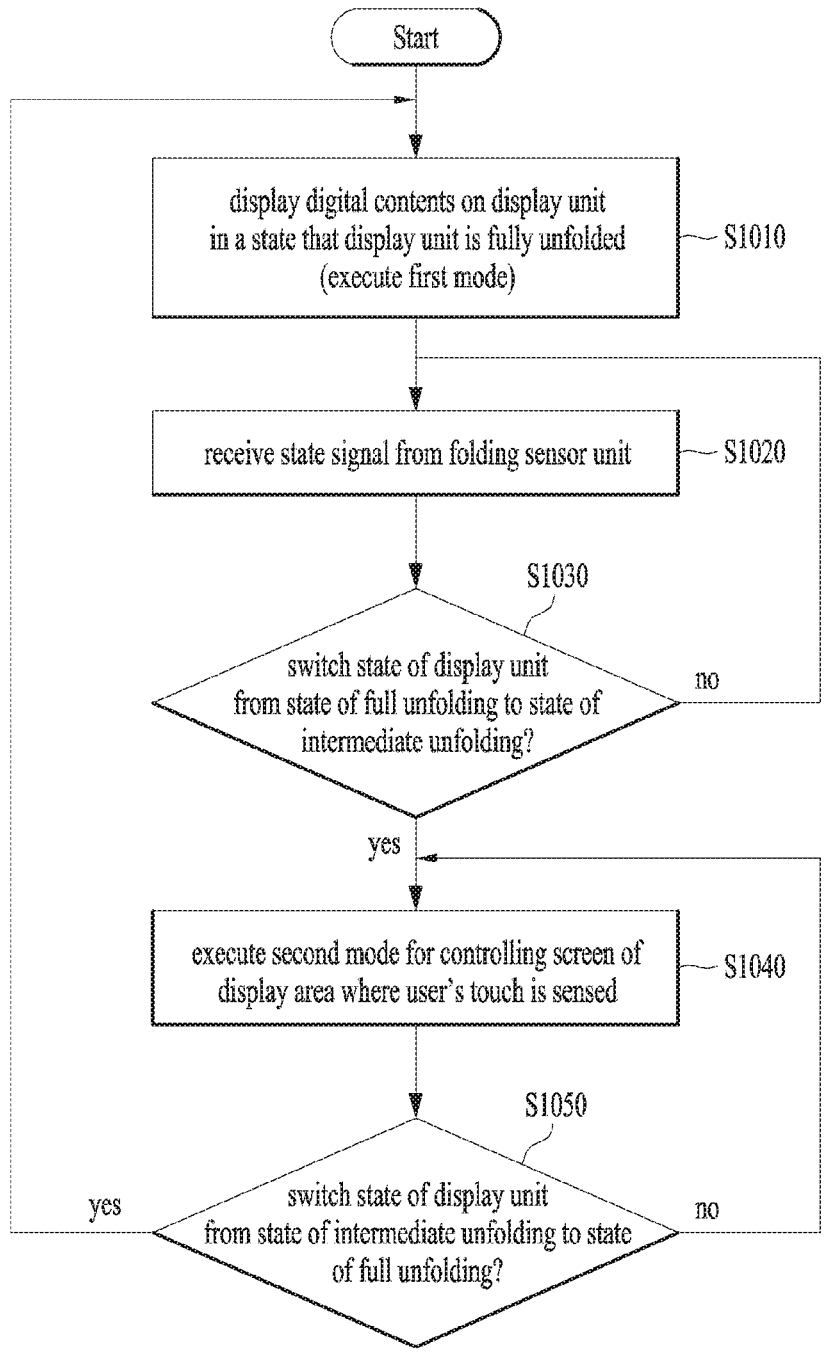

FOLDABLE DISPLAY DEVICE CAPABLE OF FIXING SCREEN BY MEANS OF FOLDING DISPLAY AND METHOD FOR CONTROLLING THE FOLDABLE DISPLAY DEVICE

CROSS-REFERENCE TO RELATED APPLICATIONS

This application is the National Stage filing under 35 U.S.C. 371 of International Application No. PCT/KR2014/011005, filed on Nov. 17, 2014, the contents of which are all hereby incorporated by reference herein in its entirety.

TECHNICAL FIELD

The present invention relates to a foldable display device and a method for controlling the same, and more particularly, to a foldable display device capable of fixing a screen by means of display folding and a method for controlling the same.

BACKGROUND ART

Recently, various types of display devices have been developed in accordance with the development of technologies. Particularly, many studies of a foldable display device provided with a plurality of displays arranged in a foldable housing have been made to fulfill the demand of a user who desires to view an image of a larger screen while enhancing portability.

A user may use a foldable display device to view only one display in a state that the device is folded, or may use the foldable display device to view a plurality of displays at a glance in a state that the device is unfolded. At this time, a screen size of digital contents displayed on the display, for example, a length of a full page of an Internet web page may be greater than the display which is unfolded. In this case, the user moves the screen in an up and down direction of the page while scrolling the screen up and down.

However, at this time, if targets which the user desires to view and compare are spaced apart from each other at a an upper portion and a lower portion of the page, the user has no option but to repeatedly move the page up and down to view the targets. Since the foldable display device has display areas split physically or visually, portions which the user desires to view may be displayed respectively through the split display areas. Therefore, it is required to display each of contents on the display areas split by the foldable display device.

DISCLOSURE

Technical Problem

An object of the present specification devised to solve the problem of the relate art is to provide a foldable display device capable of fixing a screen by means of display folding and a method for controlling the same.

Technical Solution

To achieve the above object, a foldable display device according to the present specification comprises a display unit for outputting an input signal by sensing a user's touch and including first and second display areas split spatially or visually by folding; a folding sensor unit for sensing full folding, full unfolding and intermediate folding of the display unit and outputting a state signal related to a folding level of the display unit, the intermediate folding being a process of connecting the full unfolding with the full folding; and a controller for displaying digital contents on the display unit, controlling a screen displayed on the display unit by receiving the input signal, and monitoring a state of the display unit by receiving the state signal from the folding sensor unit, wherein the controller controls the entire of the screen displayed on the display unit by means of the input signal when the digital contents are displayed on the display unit in the state of full unfolding (hereinafter, 'first mode'), and controls the screen of the display area where the user's touch is sensed from the first and second display areas when the state of full unfolding has been switched to the state of intermediate folding (hereinafter, 'second mode').

According to the embodiment of the present specification, the controller may maintain a screen of the display area where the user's touch is not sensed from the first and second display areas.

According to the embodiment of the present specification, the controller may display a size ratio of text and image displayed on the first and second display areas in the second mode equally to a size ratio of text and image in the first mode.

According to the embodiment of the present specification, the controller may control the screen of the second display area to correspond to only the input signal received through the second display area among the input signals in the second mode.

In this case, the controller may display a graphic effect, which indicates that the screen of the first display area is not controlled, on the first display area with respect to the input signal received through the first display area in the second mode.

Also, in this case, according to one embodiment, the second display area may be a display area of which size is relatively greater than that of the first display area. According to another embodiment, a position of the first display area and a position of the second display area may be set previously.

According to the embodiment of the present specification, the controller may execute the second mode when the state of full unfolding has been switched to the state of intermediate folding and the state of intermediate folding has been maintained for a predetermined time. In this case, the controller may display a graphic effect, which indicates that the second mode has been executed, on the display unit.

According to the embodiment of the present specification, the controller may not display the same portion of the contents on the first and second display areas even though an input for moving the screen of the display area is received in the second mode.

According to the embodiment of the present specification, the contents may be a plurality of sequential images, and the controller may display at least two or more sequential images among the plurality of images in the first mode and display at least one or more images on each of the first and second display areas in the second mode.

According to the embodiment of the present specification, the controller may execute the first mode when the state of intermediate folding has been switched to the state of full unfolding after executing the second mode.

In this case, according to one embodiment, the controller may display the contents on the display unit on the basis of the screen displayed on the first display area in case of the second mode. According to another embodiment, the controller may display the contents on the display unit on the basis of the screen displayed on the second display area in case of the second mode.

According to the embodiment of the present specification, the controller may end only the content of the display area where the user's touch is sensed from the first and second display areas and maintain the screen of the contents displayed on the other display area when the user's input is an input for ending the contents in the second mode.

To achieve the above object, a method for controlling a foldable display device according to the present specification is a method for controlling a foldable display device, which comprises a display unit for outputting an input signal by sensing a user's touch and including first and second display areas split spatially or visually by folding and a folding sensor unit for sensing full folding, full unfolding and intermediate folding of the display unit and outputting a state signal related to a folding level of the display unit, the intermediate folding being a process of connecting the full unfolding with the full folding, and may comprise the steps of (a) displaying digital contents on the display unit in a state of the full unfolding, and executing a first mode for controlling the entire of a screen displayed on the display unit by means of the input signal; (b) monitoring the state of the display unit by receiving the state signal from the folding sensor unit; and (c) executing a second mode for controlling the screen of the display area where the user's touch is sensed from the first and second display areas when the state of full unfolding has been switched to the state of intermediate folding.

Advantageous Effects

According to one aspect of the present specification, a user may simultaneously view screens of two desired portions from one content. Therefore, inconvenience occurring in that the user should alternately scroll the screens may be reduced.

According to another aspect of the present specification, it is possible to simultaneously compare two or more images regardless of sequence even in the case that contents are a plurality of sequential images.

BRIEF DESCRIPTION OF THE DRAWINGS

The accompanying drawings, which are included to provide a further understanding of the present specification, illustrate preferred embodiments of the present specification and together with the description serve to explain the technical spirits of the present specification, and thus the present specification should not be construed to be limited to the drawings.

FIG. 4 is an exemplary view of a first mode according to the present specification.

FIG. 9 is an exemplary view illustrating a first mode and a second mode when contents correspond to a plurality of images having sequence.

FIG. 10 is a flow chart illustrating a method for controlling a foldable display device according to one embodiment of the present specification.

BEST MODE FOR CARRYING OUT THE INVENTION

Hereinafter, the preferred embodiments of the present specification will be described in detail with reference to the accompanying drawings. At this time, although the embodiments of the present specification will be described in detail with reference to the accompanying drawings and the disclosure described by the drawings, it is to be understood that the technical spirits and principles of the present specification are not limited by such embodiments.

Figure 1:
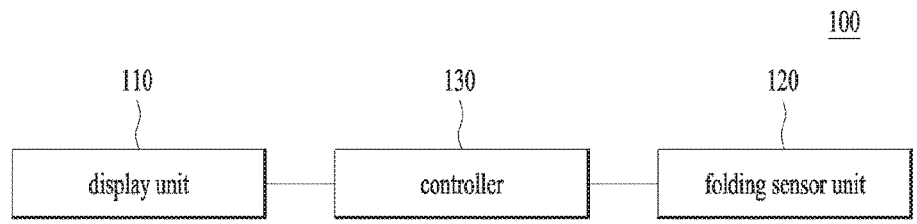
FIG. 1 is a schematic block diagram illustrating a foldable display device according to the present specification.

FIG. 1 is a schematic block diagram illustrating a foldable display device according to the present specification.

Referring to FIG. 1, the foldable display device 100 according to the present specification comprises a display unit 110, a folding sensor unit 120, and a controller 130.

The display unit 110 may output an input signal by sensing a user's touch, and may include at least two or more display areas split spatially or visually by folding. The display unit 110 may output digital contents in accordance with a control command of the controller 130.

The folding sensor unit 120 may sense full folding of the display unit 110, full unfolding thereof, and intermediate folding which is a process of connecting the full folding with the full unfolding. The folding sensor unit 120 may output a state signal related to a folding level of the display unit 110.

The controller 130 may display digital contents on the display unit 110. The controller 130 may control a screen displayed on the display unit 110 by receiving the input signal. Also, the controller 130 may monitor the state of the display unit 110 by receiving the state signal from the folding sensor unit 120.

The display unit 110, the folding sensor unit 120 and the controller 130 are electrically connected with one another. Therefore, it is possible to give and take information among these elements. A communication protocol for giving and taking information among these elements is not limited to a specific protocol, and various communication protocols that may easily be used by those (hereinafter, 'skilled persons') skilled in the art to which the present specification pertains may be used.

Meanwhile, the foldable display device 100 may further comprise various elements if necessary.

Figure 2:
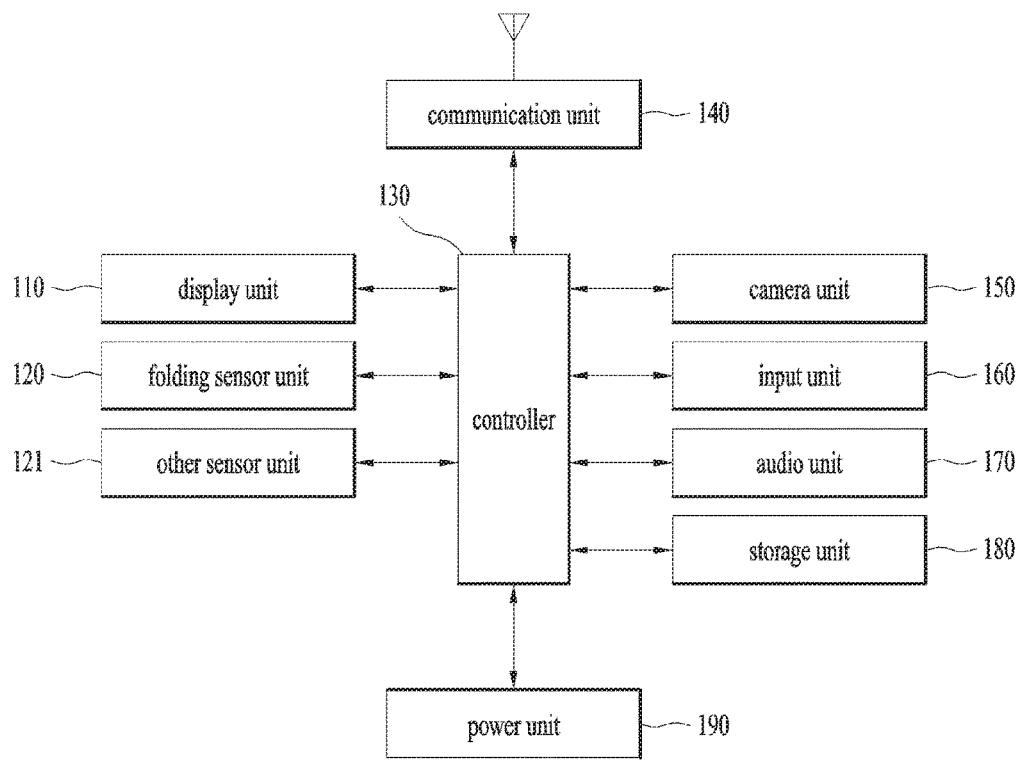
FIG. 2 is a schematic block diagram illustrating a foldable display device according to the embodiment of the present specification.

FIG. 2 is a schematic block diagram illustrating a foldable display device according to the embodiment of the present specification.

Referring to FIG. 2, the foldable display device 100 may include a display unit 110, a folding sensor unit 120, other sensor unit 121, a controller 130, a communication unit 140, a camera unit 150, an input unit 160, an audio unit 170, a storage unit 180, and a power unit 190.

Since the display unit 110, the folding sensor unit 120 and the controller 130 have been described as above, their repeated description will be omitted.

The other sensor unit 121 may deliver a user input or an environment recognized by the device to the controller 130 by using a sensor installed in the device. The other sensor unit 121 may include a plurality of sensors. For example, the plurality of sensors may include a gravity sensor, a geomagnetic sensor, a motion sensor, a gyro sensor, an acceleration sensor, an inclination sensor, a brightness sensor, an altitude sensor, a smell sensor, a temperature sensor, a depth sensor, a pressure sensor, a bending sensor, an audio sensor, a video sensor, a GPS sensor, a touch sensor, etc.

The communication unit 140 may perform communication with an external network using various protocols and transmit and receive digital data to and from the external network by accessing the external network through a wire or wirelessly.

The camera unit 150 may take photos and moving images. The camera unit 150 may be used as a motion sensor or video sensor. The camera unit 150 may include a plurality of cameras.

The input unit 160 may externally receive a user command. The input unit 160 may be implemented in various manners. For example, the input unit 160 may be implemented as a keyboard, a key pad, a mouse, a touch pad, a button, a soft key, etc. In a broad sense, the input unit 160 may include a microphone, a touch screen, etc. The microphone may receive a user's voice, and the touch screen may receive a touch gesture of the user. As the case may be, the microphone may be included in the audio unit.

The audio unit 170 may include an audio output means such as a speaker and an audio input means such as a microphone. The audio unit 170 may be used as an audio sensor.

The storage unit 180 may store various digital data such as video, audio, photo, moving image and application. For example, the storage unit 180 may include a RAM, a ROM, a cache memory, a hard disk drive (HDD), a solid state drive (SSD), a CD, a DVD, a Blu-ray disk, a floppy disk (FDD), a magnetic disk, a memory card, a flash memory, and a USB memory.

The power unit 190 is a power source connected with a battery or an external power source, and may supply a power to the device.

Meanwhile, the foldable display device 100 according to the present specification means various types of devices that may process various digital data and perform corresponding operations. Although the foldable display device 100 is preferably a mobile communication device, the foldable display device 100 may be one of a notebook computer, a personal computer, a tablet computing device, a portable navigation device, a portable video player, a personal digital assistant (PDA), and other similar device. Also, the elements of the foldable display device 100 shown in FIG. 2 are provided as exemplary embodiments, and it is to be understood that the present specification may be carried out by the foldable display device 100 that comprises more or less elements than those shown in FIG. 2.

FIG. 3 is an exemplary view illustrating various examples of a type of a foldable display device according to the present specification.

Figure 3A:
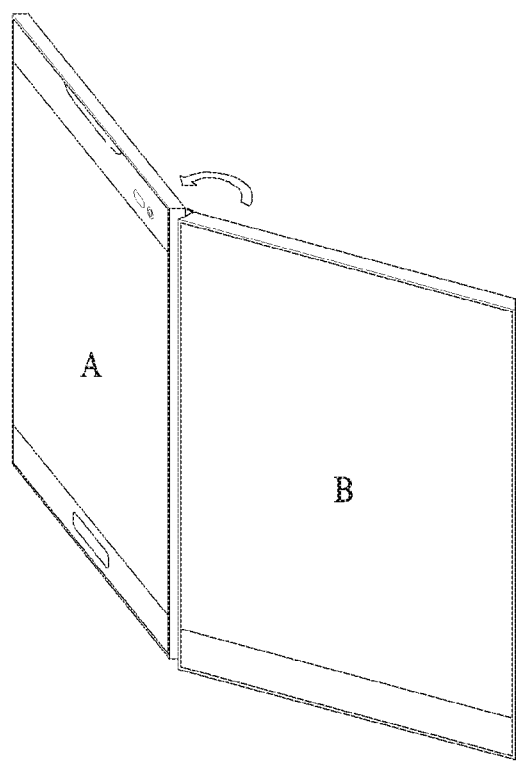
FIG. 3 is an exemplary view illustrating various examples of a type of a foldable display device according to the present specification.

Referring to FIG. 3*a*, it is noted that a 2-foldable display device is comprised of two display areas A and B. In a state that the foldable display device is fully unfolded, the two display areas A and B are connected with each other to be seen as one display. In a state that the foldable display device is fully folded, the two display areas A and B are spaced apart from each other to be seen as two displays. Therefore, the embodiment shown in FIG. 3*a* includes a display unit that includes two display areas A and B spaced apart from each other spatially or visually by folding.

Referring to FIG. 3*b*, it is noted that a 2-foldable display device is comprised of three display areas A, B and C. In a state that the foldable display device is fully unfolded, only one display area A is seen. In a state that the foldable display device is fully folded, the other two display areas B and C are connected with each other to be seen as one display. Therefore, the embodiment shown in FIG. 3*b* includes a display unit that includes two display areas B and C spaced apart from each other spatially or visually by folding.

Referring to FIG. 3*c*, it is noted that a 3-foldable display device is comprised of three display areas A, B and C. In a state that the foldable display device is fully unfolded, the three display areas A, B and C are connected with one another to be seen as one display. In a state that the foldable display device is fully folded, the three display areas A, B and C are spaced apart from one another to be seen as the respective displays. Therefore, the embodiment shown in FIG. 3*c* includes a display unit that includes three display areas A, B and C spaced apart from one another spatially or visually by folding.

Referring to FIG. 3*d*, it is noted that a 3-foldable display device is comprised of three display areas A, B and C. The foldable display device of FIG. 3*d* is different from that of FIG. 3*c* in a folding direction. Therefore, it is noted that the three display areas A, B and C of the foldable display device are folded and then unfolded in a shape of 'Z'. In a state that the foldable display device is fully unfolded, the three display areas A, B and C are connected with one another to be seen as one display. In a state that the foldable display device is fully folded, the three display areas A, B and C are spaced apart from one another to be seen as the respective displays. Therefore, the embodiment shown in FIG. 3*d* includes a display unit that includes three display areas A, B and C spaced apart from one another spatially or visually by folding.

Referring to FIG. 3*e*, it is noted that a foldable display device comprises a flexible display unit. The flexible display unit is physically seen as one display but includes two display areas A and B split spatially or visually by folding.

As shown in FIGS. 3*a* to 3*e*, the foldable display device 100 according to the present specification may have various embodiments in shape and structure. The display unit 110 included in the foldable display device 100 according to the present specification may also have various types. However, the display unit 110 may include different display areas split spatially or visually by folding. Hereinafter, in this specification, the different areas split by folding will be referred to as 'a first display area' and 'a second display area'. The terms "the first and the second" are intended to identify different display areas from each other, but do not indicate a priority between the display areas. Therefore, any one of the different display areas spaced apart from each other by folding may be the first display area and the other one may be the second display area.

Meanwhile, the display unit 110 may have three states by means of folding of the foldable display device 100. The three states may include 'full unfolding' where the display areas belonging to the display unit 110 form one plane on a space, 'full folding' where all structures which may move in view of a mechanical structure of the foldable display device 100 are matched with each other, and 'intermediate folding' which is a process of connecting the 'full folding' with the 'full unfolding'.

Hereinafter, a control process of the controller 130 will be described in more detail. For convenience of understanding, in this specification, the foldable display device will be described based on a Z type 3-foldable display device having three display units A, B and C shown in FIG. 3d.

FIG. 4 is an exemplary view of a first mode according to the present specification.

Referring to (a) of FIG. 4, it is noted that a content is displayed on the display unit 110 in a state of full unfolding of the display unit 110. The content is a web page, and is exemplarily shown through a web browser application. Generally, a user may scroll a web page screen up and down by touching the display unit to view another portion of the webpage.

Referring to (b) of FIG. 4, it is noted that a user inputs a scroll through the display unit 110. The display unit 110 may output an input signal related to a direction and size of the scroll by sensing a user's touch. The controller 130 may control the screen displayed on the display unit 110 to move as much as the input direction and size by receiving the input signal. This control mode of the controller 130 will be referred to as 'a first mode' in this specification. That is, the first mode is characterized in that the entire of the screen displayed on the display unit 110 is controlled by the input signal.

Meanwhile, the user may desire to fix some screen while the first mode is being executed. For example, it is assumed that the user desires to simultaneously view the uppermost content and the lowest content of the web page. It is also assumed that a length of the web page is longer than that of the entire screen of the display unit 110 so as not to allow the user to simultaneously view the uppermost content and the lowest content of the web page. Under the circumstances, the user of the display device according to the related art should alternately compare the uppermost content of the web page with the lowest content of the web page while scrolling the screen up and down.

However, if a second mode of the foldable display device 100 according to the present specification is executed, the above inconvenience may be reduced. The user of the foldable display device 100 according to the present specification performs a behavior for slightly folding the display unit 110 when desiring to simultaneously view the uppermost content and the lowest content of the web page. At this time, the folding sensor unit 120 outputs a state signal related to a folded level of the display unit 110. Since the controller 130 monitors the state of the display unit 110 by receiving the state signal from the folding sensor unit 120, it is noted that the state of the display unit 110 is switched from the state of full unfolding to the state of intermediate folding. At this time, the controller 130 executes a mode for controlling the screen of the display area where the user's touch is sensed from the first and second display areas. In this specification, the mode will be referred to as 'the second mode'. The second mode will be described in more detail with reference to FIGS. 5 and 6.

Figure 5:
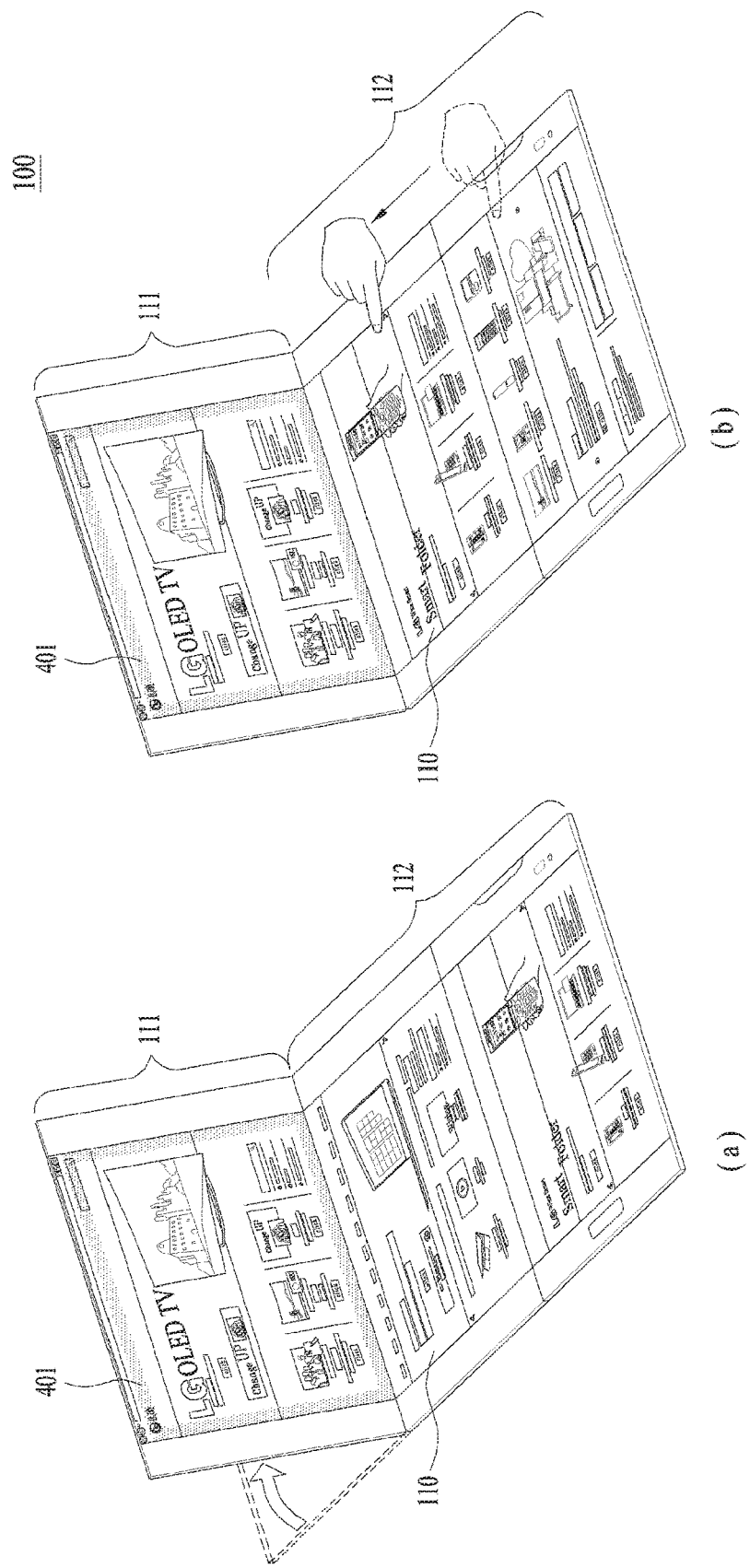
FIG. 5 is an exemplary view of a second mode according to the present specification.

FIG. 5 is an exemplary view of a second mode according to the present specification.

Referring to (a) of FIG. 5, it is noted that the state of the display unit 110 is the state of intermediate folding. At this time, the display unit 110 is split into a first display area 111 and a second display area 112 by folding. As shown in (a) of FIG. 5, when the display unit 110 is switched from the state of full unfolding to the state of intermediate folding, the controller 130 executes the second mode.

At this time, the controller 130 may display a size ratio of text and image displayed on the first and second display areas in the second mode equally to a size ratio of text and image in the first mode.

Meanwhile, according to one embodiment of the present specification, the controller 130 may execute the second mode when the state of the display unit 110 is switched from the state of full unfolding to the state of intermediate folding and the state of intermediate folding is maintained for a predetermined time. The controller 130 may determine whether the behavior of the user for folding the display unit 110 is a behavior for switching the state of full unfolding to the state of full folding or a behavior for executing the second mode, by identifying whether the state of intermediate folding has been maintained for a predetermined time.

When the second mode is executed, the controller 130 may display a graphic effect indicating that the second mode has been executed, on the display unit 110. Although a graphic effect for making the surrounding of the first display area 111 dark is shown in FIG. 5 as an example, various graphic effects such as screen flickering and alarm message may be displayed.

In the second mode, the controller 130 controls the screen of the display area where the user's touch is sensed from the first display area 111 and the second display area 112. Referring to (b) of FIG. 5, it is noted that the user performs a scroll input by touching the second display area 112. At this time, the controller 130 moves the screen of the second display area 112 by receiving the input signal. As a result, as shown in (b) of FIG. 5, it is noted that the screen of the first display area 111 is maintained without any change and only the screen of the second display area 112 moves to a scroll direction. At this time, the controller 130 may maintain the screen of the display area where the user's touch is sensed from the first display area 111 and the second display area 112.

If the second mode of the foldable display device according to the present specification is used, the user may simultaneously view desired two portions of a web page on the screen at a glance. Therefore, inconvenience occurring in that the user should alternately compare the uppermost content with the lowest content of the web page while scrolling the web page up and down may be avoided.

In the example shown in FIG. 5, although the controller 130 moves the screen displayed on the second display area 112 to correspond to the user's input which is input to the second display area 112, the controller 130 may move the screen displayed on the first display area 111 to correspond to the user's input which is input to the first display area 111.

Meanwhile, according to one embodiment of the present specification, the controller 130 may control the screen of the second display area 112 to correspond to only the input signal received through the second display area 112 among the input signals in the second mode. That is, the screen displayed on the first display area 111 is fixed in spite of the user's input. At this time, the controller 130 may display a graphic effect, which indicates that the screen of the first display area 111 is not controlled, on the first display area 111 with respect to the input signal received through the first display area in the second mode. An example of the graphic effect may include 'a bounce back' for moving the screen and then returning the screen to its original position.

According to one embodiment of the present specification, the second display area 112 may be a display area of which size is relatively greater than the first display area 111.

In FIG. 5, in accordance with the embodiment, the display area arranged on the upper end based on the portion where folding occurs is set to the first display area 111 and the display area arranged on the lower end based on the portion where folding occurs is set to the second display area 112. However, on the contrary to the embodiment of FIG. 5, the second the second display area 112 may be a display area of which size is relatively smaller than the first display area 111.

According to another embodiment of the present specification, the position of the first display area 111 and the position of the second display area 112 may be set previously. In the embodiment that folding always occurs based on the center of the display unit 110 like the foldable display device shown in FIG. 3a, the display area which will become the first display area or the second display area may be set previously.

Meanwhile, according to one embodiment of the present specification, the controller 130 may not display the same portion of the contents on the first display area 111 and the second display area 112 even though the input for moving the screen of the display area is received in the second mode.

Figure 6:
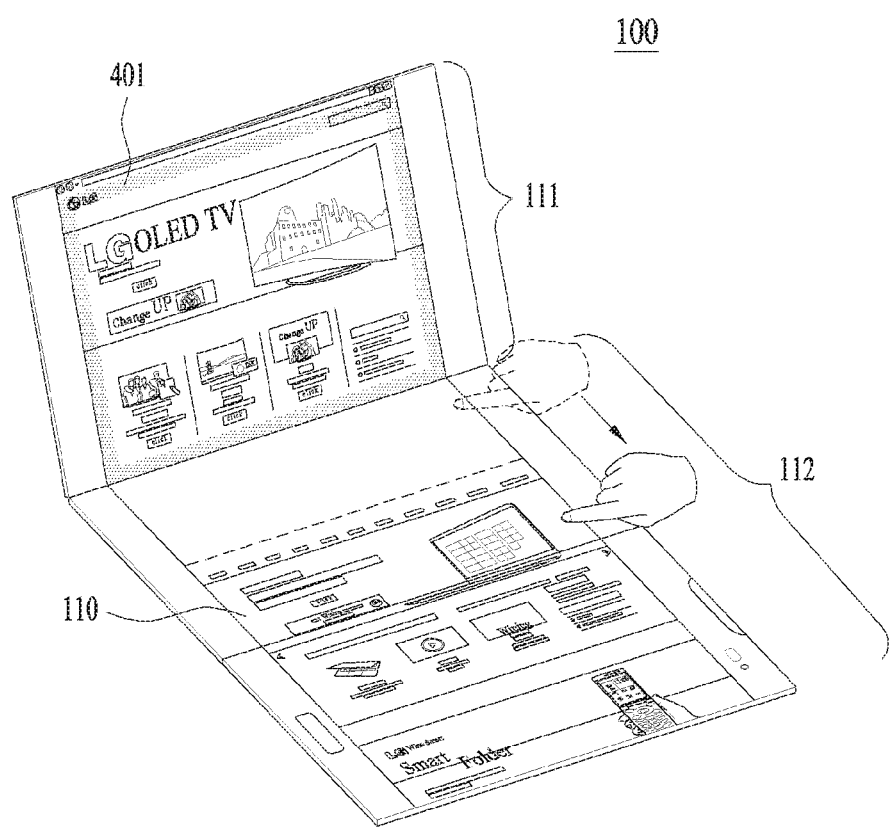
FIG. 6 is an exemplary view of a second mode according to the present specification.

FIG. 6 is an exemplary view of a second mode according to the present specification.

Referring to FIG. 6, it is noted that the user downwardly scrolls the screen of the second display area 112. At this time, the screen displayed on the second display area 112 will be described together with FIG. 4. Referring to FIG. 4 again, it is noted that the content displayed on the first display area 111 is connected with the content displayed on the second display area 112. Therefore, if the user downwardly scrolls the screen of the second display area 112, the content displayed on the first display area 111 should also be displayed on the second display area 112. However, the controller 130 may not display the same portion of the contents on the first display area 111 and the second display area 112 as shown in FIG. 6 even though the input for moving the screen of the display area is received in the second mode.

Figure 7:
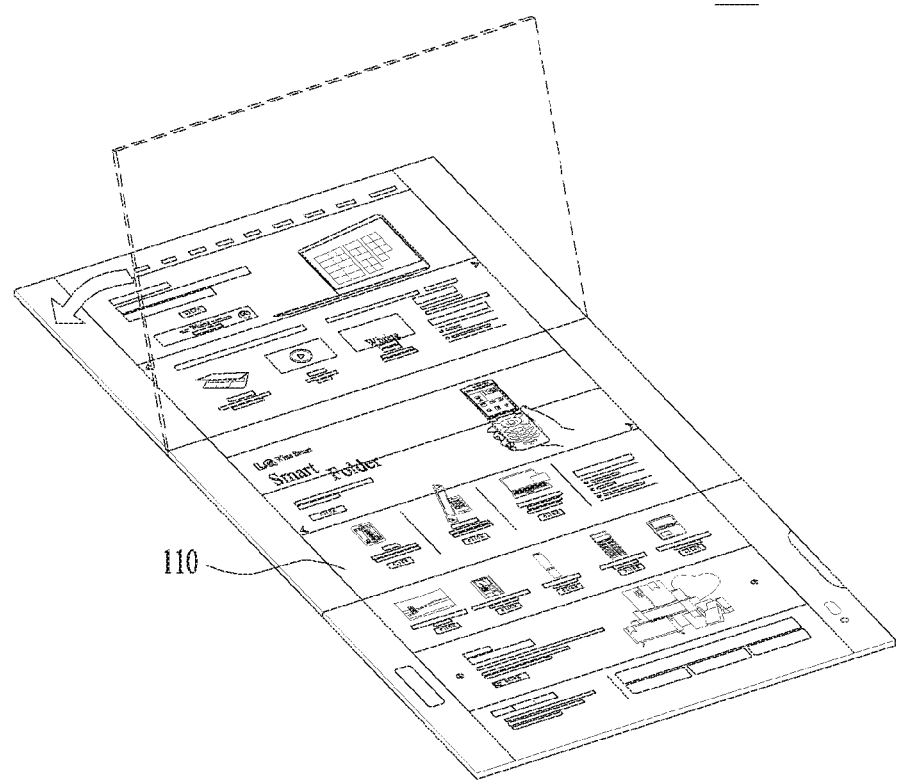
FIG. 7 is an exemplary view illustrating that a first mode is executed again in a foldable display device according to the present specification.

FIG. 7 is an exemplary view illustrating that a first mode is executed again in a foldable display device according to the present specification.

Referring to FIG. 7, it is noted that the state of the display unit 110 is switched from the state of intermediate folding to the state of full unfolding. As such, if the user switches the state of the display unit 110 from the state of intermediate folding to the state of full unfolding through the behavior contrary to the previous behavior, the controller 130 may determine that the user desires to return to the previous mode, that is, the first mode. Therefore, the controller 130 may execute the first mode when the state of intermediate folding is switched to the state of full unfolding after the second mode is executed.

In this case, when the first mode is executed again, it is required to determine a corresponding display area to display the display unit 110 based on the screen displayed on the corresponding display area.

According to one embodiment of the present specification, the controller 130 may display the content on the display unit 110 on the basis of the screen displayed on the first display area 111 in case of the second mode.

According to another embodiment of the present specification, the controller 130 may display the content on the display unit 110 on the basis of the screen displayed on the second display area 112 in case of the second mode. In the embodiment shown in FIG. 7, the controller 130 displays the content on the display unit 110 on the basis of the screen displayed on the second display area 112 in case of the second mode shown in FIG. 5.

Meanwhile, when the user's input in the second mode is an input for ending the content, the controller 130 may end only the content of the display area where the user's touch is sensed from the first display area 111 and the second display area 112 and maintain the screen of the content displayed on the other display area.

Figure 8:
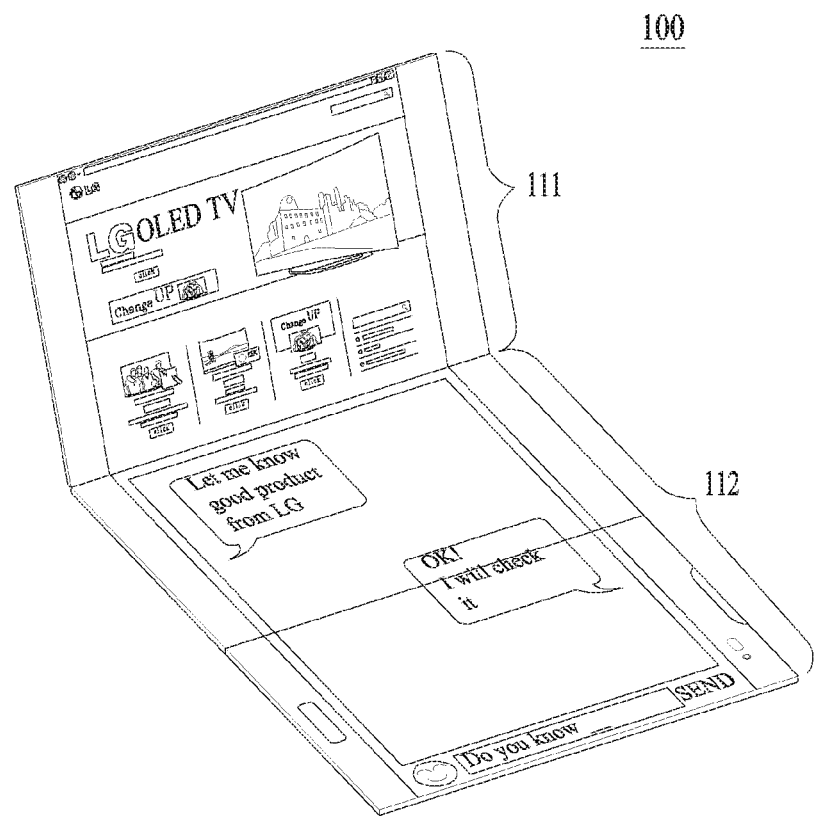
FIG. 8 is an exemplary view illustrating that a content of one of a first display area and a second display area ends in accordance with the present specification.

FIG. 8 is an exemplary view illustrating that a content of one of a first display area and a second display area ends in accordance with the present specification.

Referring to FIG. 8, it is noted that a messenger application not a web page is executed on the second display area 112. In the exemplary view shown in FIG. 7, the controller 130 ends the content of the second display area 112 in accordance with the user's input in the second mode. At this time, the controller 130 maintains the screen of the content displayed on the first display area. Afterwards, the controller 130 executes the message application in accordance with the user's input. According to this embodiment, if the state of intermediate folding of the display unit 110 is maintained even though the content ends, the controller 130 may maintain the screen of the display area where the user's input is not received.

Meanwhile, although the embodiments of FIGS. 4 to 8 have been described based on that the content is a web page, the digital contents according to the present specification are not limited to the web page. Various data executed by various applications included in the foldable display device 100 according to the present specification and displayed on the display unit 110 may be the digital contents.

According to the embodiment of the present specification, the contents may be a plurality of images having sequence. In this case, the controller 130 may display at least two or more sequential images among the plurality of images in the first mode and display at least one or more images on the first and second areas in the second mode.

FIG. 9 is an exemplary view illustrating a first mode and a second mode when contents correspond to a plurality of images having sequence.

Referring to (a) of FIG. 9, it is noted that the state of the display unit 110 is the state of full unfolding. Therefore, the controller 130 executes the first mode. The controller 130 may display at least two or more sequential images among the plurality of images in the first mode. In (a) of FIG. 9, it is noted that three sequential images are displayed on the display unit 110.

Referring to (b) of FIG. 9, it is noted that the state of the display unit 110 is the state of intermediate unfolding. Therefore, the controller 130 executes the second mode. The controller 130 may display at least one or more images on each of the first display area 111 and the second display area 112 in the second mode. In (b) of FIG. 9, it is noted that two images are displayed on the second display area 112. The state shown in (b) of FIG. 9 is that the controller 130 controls the screen of the second display area 112 by means of the input signal for moving the screen input through the second display area 112 by means of the user. Since the contents are a plurality of sequential images, the controller 130 may display an image having next sequence on the second display area 112 in accordance with a screen moving direction.

Hereinafter, a method for controlling the aforementioned foldable display device 100 will be described. However, since the respective elements included in the foldable display device 100 and their roles have been already described, their repeated description will be omitted.

FIG. 10 is a flow chart illustrating a method for controlling a foldable display device according to one embodiment of the present specification.

Referring to FIG. 10, first of all, in step S1010, the controller 130 displays digital contents on the display unit 110 in a state that the display unit 110 is fully unfolded. At this time, the controller 130 executes a first mode for controlling the entire of the screen displayed on the display unit 110 by means of the input signal output to the folding sensor unit 120. The controller 130 finishes the process of the step S1010 and moves to step S1020.

In the step S1020, the controller 130 may monitor the state of the display unit 110 by receiving the state signal of the display unit 110 from the folding sensor unit 120. The controller 130 finishes the process of the step S1020 and moves to step S1030.

In the step S1030, the controller 130 determines whether the state of the display unit 110 has been switched from the state of full unfolding to the state of intermediate unfolding. If the state of the display unit 110 has not been switched from the state of full unfolding to the state of intermediate unfolding ('no' of step S1030), the controller moves to the step S1020. Therefore, the controller 130 repeatedly executes the steps S1020 and S1030. On the other hand, if the state of the display unit 110 has been switched from the state of full unfolding to the state of intermediate unfolding ('yes' of step S1030), the controller 130 moves to step S1040.

Meanwhile, when the state of the display unit 110 has been switched from the state of full unfolding to the state of intermediate unfolding ('yes' of step S1030), the controller 130 may determine whether the state of full unfolding is switched to the state of intermediate folding and the state of intermediate folding is maintained for a predetermined time. When the state of intermediate folding is maintained for a predetermined time, the controller 130 may move to the step S1040.

In the step S1040, the controller 130 may execute the second mode for controlling the screen of the display area where the user's touch is sensed from the first and second display areas. At this time, the controller 130 may maintain the screen of the display area where the user's touch is not sensed from the first and second display areas 111 and 112. The controller 130 may display a size ratio of text and image displayed on the first and second display areas 111 and 112 equally to a size ratio of text and image in the first mode.

Meanwhile, according to one embodiment of the present specification, the controller 130 may move to step S1050 after executing the step S1040.

In the step S1050, the controller 130 determines whether the state of the display unit 110 has been switched from the state of intermediate unfolding to the state of full unfolding. If the state of the display unit 110 has not been switched from the state of intermediate unfolding to the state of full unfolding ('no' of step S1050), the controller 130 moves to the step S1040. Therefore, the controller 130 repeatedly executes the steps S1040 and S1050. On the other hand, if the state of the display unit 110 has been switched from the state of intermediate unfolding to the state of full unfolding ('yes' of step S1050), the controller 130 moves to the step S1010. Therefore, the controller 130 executes the first mode and the second mode suitable for the condition while repeatedly executing the steps S1010 to S1050.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Specific structural or functional descriptions in the embodiments disclosed in this specification are intended to describe the embodiments, and the embodiments can be carried out in various forms and it should not be understood that the scope of the invention is limited by the embodiments described in this specification.

Since the embodiments according to the present specification may be carried out in other specific ways and various modifications may be made in the embodiments, specific embodiments will be illustrated in the drawings and will be described in detail in this specification. However, this is not intended to limit the embodiments according to the present specification to a specific disclosed type, and it is to be understood that the embodiments according to the present specification include all changes, equivalents, or replacements included in spirits and technical scope of the present specification.

Although the terms such as "first" and/or "second" in this specification may be used to describe various elements, it is to be understood that the elements are not limited by such terms. The terms may be used to identify one element from another element. For example, the first element may be referred to as the second element, and vice versa within the range that does not depart from the scope of the present specification.

In the specification, when a part "comprises" or "includes" an element, it means that the part further comprises or includes another element unless otherwise mentioned. Also, the term " . . . module" disclosed in the specification means a unit for processing at least one function or operation, and may be implemented by hardware, software or combination of hardware and software.

Although the present specification has been described through the detailed embodiments, it will be apparent to those skilled in the art that the present specification can be embodied in other specific forms without departing from the spirit and essential characteristics of the specification. The scope of the specification should be determined by reasonable interpretation of the appended claims and all change which comes within the equivalent scope of the specification are included in the scope of the specification.

Also, although one dependent component is added for convenience of understanding in the description of the embodiments of the present specification, two or more dependent components may be added in the embodiments of the present specification. Thus, the scope of the present specification is not limited by the embodiment disclosed in this specification.

MODE FOR CARRYING OUT THE INVENTION

Various embodiments have been described in the best mode for carrying out the present specification. It will be apparent to those skilled in the art that the present specification can be embodied in other specific forms without departing from the spirit and essential characteristics of the specification. Thus, the scope of the specification should be determined by reasonable interpretation of the appended claims and all change which comes within the equivalent scope of the specification are included in the scope of the specification.

INDUSTRIAL APPLICABILITY

The present specification may fully or partially be applied to electronic devices.

The invention claimed is:

1. A foldable display device comprising:
   a display unit configured to output an input signal in response to a user's touch received on the display unit, the display unit comprising first and second display areas configured to be split spatially or visually by folding of the display unit;
   a folding sensor unit configured to:
     sense full folding, full unfolding, and intermediate folding of the display unit; and
     output a state signal related to a folding level of the display unit, the intermediate folding being a state of the display unit in between the full unfolding and the full folding; and
   a controller configured to:
     cause the display unit to display digital contents;
     control a screen displayed on the display unit response to the input signal received from the display unit;
     monitor the state of the display unit in response to the state signal received from the folding sensor unit;
     enter a first mode and control an entire area of the screen displayed on the display unit in response to the input signal when the digital contents are displayed on the display unit while the state of the display unit is the full unfolding;
     enter a second mode and control a screen of one of the first and second display areas at which the user's touch is received when the state of the display unit is switched from the full unfolding to the intermediate folding;
     control a screen of the second display area in response to the input signal when the user's touch is received on the second display area in the second mode;
     cause the display unit to display a graphic effect, which indicates that a screen of the first display area is not controlled, on the first display area in response to the input signal when the user's touch is received on the first display area in the second mode; and
     cause the screen of the second display area to move in response to a scroll input signal when the scroll input signal corresponds to a scroll input received on the second display area in the second mode, wherein the screen of the first display area is maintained without being moved in response to the scroll input.

2. The foldable display device according to claim 1, wherein the controller is further configured to cause the display unit to maintain a screen of one of the first and second display areas that is not touched by the user.

3. The foldable display device according to claim 1, wherein the controller is further configured to cause the display unit to maintain a size ratio of text and image displayed on the first and second display areas in the second mode when the foldable display device is switched from the first mode to the second mode such that the size ratio is equal to a size ratio of text and image displayed in the first mode.

4. The foldable display device according to claim 1, wherein a size the second display area is greater than a size of the first display area.

5. The foldable display device according to claim 1, wherein a position of the first display area and a position of the second display area are preset prior to receiving the user's touch.

6. The foldable display device according to claim 1, wherein the controller is further configured to execute the second mode when the state of the display unit is switched from the full unfolding to the intermediate folding and the state of intermediate folding is maintained for a predetermined time.

7. The foldable display device according to claim 6, wherein the controller is further configured to cause the display unit to display a graphic effect which indicates that the foldable display device is in the second mode.

8. The foldable display device according to claim 1, wherein the controller is further configured to cause the display unit to display different portions of the digital contents on the first and second display areas in response to an input for moving the screen of the display area received in the second mode.

9. The foldable display device according to claim 1, wherein the digital contents comprise a plurality of sequential images, and the controller is further configured to cause the display unit to display at least two or more sequential images among the plurality of sequential images in the first mode and display at least one or more images on each of the first and second display areas in the second mode.

10. The foldable display device according to claim 9, wherein the controller is further configured to cause the display unit to stop displaying only content on one of the first and second display areas on which the user's touch is received when the input signal generated by the user's touch is for stopping displaying the content, content being displayed on another one of the first and second display areas maintained.

11. The foldable display device according to claim 1, wherein the controller is further configured to execute the first mode when the state of the display unit is switched from the intermediate folding to the full unfolding after executing the second mode.

12. The foldable display device according to claim 11, wherein the controller is further configured to cause the display unit to display the digital contents based on the screen displayed on the first display area in case of the second mode.

13. The foldable display device according to claim 11, wherein the controller is further configured to cause the display unit to display the digital contents based on the screen displayed on the second display area in case of the second mode.

14. The foldable display device according to claim 1, wherein the controller is further configured to cause the display unit to display two separate portions of the same digital contents together.

15. The foldable display device according to claim 14, wherein the controller is further configured to cause the display unit to display an uppermost portion of the same digital contents in the first display area and a lowermost portion of the same digital contents in the second display area simultaneously without requiring scrolling the digital contents up or down to display the uppermost portion or the lowermost portion.

16. The foldable display device according to claim 15, wherein the digital contents comprise a web page.

17. A method for controlling a foldable display device, which comprises a display unit for outputting an input signal in response to a user's touch, the display unit comprising first and second display areas configured to be split spatially or visually by folding of the display unit, and a folding sensor unit for sensing full folding, full unfolding and intermediate folding of the display unit and outputting a state signal related to a folding level of the display unit, the intermediate folding being a state of the display unit in between the full unfolding and the full folding, the method comprising:

displaying digital contents on the display unit;

executing a first mode for controlling an entire of a screen displayed on the display unit in response to the input signal received from the display unit when the state of the display unit is the full unfolding;

monitoring the state of the display unit in response to the state signal received from the folding sensor unit;

executing a second mode for controlling a screen of one of the first and second display areas at which the user's touch is received when the state of the display unit is switched from the full unfolding to the intermediate folding;

executing the second mode when the state of the display is switched from the full unfolding to the intermediate folding and when the intermediate folding is maintained for a predetermined time;

executing the first mode when the state of the display is switched from the intermediate folding to the full unfolding;

controlling a screen of the second display area in response to the input signal when the user's touch input is received on the second display area in the second mode;

displaying a graphic effect, which indicates that a screen of the first display area is not controlled, on the first display area in response to the input signal when the user's touch is received on the first display area in the second mode; and causing the screen of the second display area to move in response to a scroll input signal when the scroll input signal corresponds to a scroll input received on the second display area in the second mode, wherein the screen of the first display area is maintained without being moved in response to the scroll input.

18. The method according to claim 17, wherein executing the second mode comprises maintaining a screen of one of the first and second display areas that is not touched by the user.

19. The method according to claim 17, wherein executing the second mode comprises maintaining a size ratio of text and image displayed on the first and second display areas in the second mode such that the size ratio is equal to a size ratio of text and image displayed in the first mode when the state of the display unit is switched from the full unfolding to the intermediate folding.

* * * * *